United States Patent
Mehta et al.

(10) Patent No.: US 7,568,013 B1
(45) Date of Patent: *Jul. 28, 2009

(54) MULTIPLE MESSAGE SEND ROUTINE FOR NETWORK PACKETS

(75) Inventors: Ashish Kishorchandra Mehta, Fremont, CA (US); Cahya Adiansyah Masputra, Millbrae, CA (US); Michael Francis Speer, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 721 days.

This patent is subject to a terminal disclaimer.

(21) Appl. No.: 11/196,079

(22) Filed: Aug. 3, 2005

(51) Int. Cl.
*G06F 15/16* (2006.01)
*G06F 13/00* (2006.01)

(52) U.S. Cl. .................. 709/207; 709/250; 719/319; 719/313; 711/147

(58) Field of Classification Search .................. None
See application file for complete search history.

(56) References Cited

U.S. PATENT DOCUMENTS

| 5,222,217 | A | * | 6/1993 | Blount et al. | 707/204 |
| 6,163,812 | A | * | 12/2000 | Gopal et al. | 719/310 |
| 2003/0037178 | A1 | * | 2/2003 | Vessey et al. | 709/319 |
| 2007/0011687 | A1 | * | 1/2007 | Ilik et al. | 719/313 |

OTHER PUBLICATIONS

M. Karuzis; DCE RPC/DG Protocol Enhancements; Oct. 1992; pp. 1-18.

* cited by examiner

*Primary Examiner*—Wen-Tai Lin
(74) *Attorney, Agent, or Firm*—Osha • Liang LLP

(57) ABSTRACT

A method for sending a plurality of messages to a plurality of recipients including obtaining the plurality of messages for the plurality of recipients, grouping the plurality of messages into a data structure, generating a system call from a user-level application to a kernel, wherein the system call includes a reference to the data structure, and for each message in the plurality of messages in the data structure: extracting a selected message from the plurality of messages in the data structure using the reference to the data structure, and sending the selected message to one of the plurality of recipients.

21 Claims, 5 Drawing Sheets

MULTIPLE MESSAGE SEND ROUTINE FOR NETWORK PACKETS

BACKGROUND

A distributed computer system typically includes a number of interconnected nodes. Each nodes typically includes a processor and memory. In addition, the nodes also include the necessary network hardware and software to communicate with other nodes in the distributed system. The distributed computer system may also contain one or more routers that pass messages between nodes. Often, a message from the sending node passes through one or more routers before the message arrives at the receiving node.

Nodes in the networked computer system may also have a user level space in which the user-level applications (such as internet browsers) operate and a kernel space. The separation allows for stability and security in the system and for the user-level application to operate without requiring knowledge of the underlying hardware. For example, the kernel is responsible for allocating memory in hardware for a user-level application to use when executing. When the user-level application requests memory, rather than simply returning to the user the physical address (i.e., disk, block, sector, etc.) the kernel creates a virtual address space for the user-level application, thereby isolating the application from the hardware.

The virtual address space allows for the user-level application to execute in what appears to be a continuous block of memory without needing to have knowledge of hardware or even the other applications running simultaneously. In order to provide such functionality, the kernel has a virtual memory system. The virtual memory system employs a Central Processing Unit (CPU) Memory Management Unit (MMU) to enforce the management of virtual memory. The MMU is responsible for allocating the memory and performing the translations from the virtual address to the physical address. Not only does the user-level application use virtual addressing in order to execute, but the kernel also uses virtual addresses when executing. Thus, the MMU not only provides translations for the user-level application, but also for the kernel-level application.

Another function that the kernel provides through the MMU is direct memory access (DMA). With DMA, a user-level application may store or retrieve information from memory with minimal use of processor. The processor is only required for setting up the transfer and notifying when the transfer is complete.

When the user-level application sends a message on a node, the user-level application makes a request to the kernel (e.g., a system call) containing a socket descriptor, a pointer to a message structure, the length of the message, and any flags required when sending the message. The socket descriptor identifies a socket which is often created prior to the send request. A socket defines the endpoints of a connection. Specifically, when two applications are on two different nodes and are connected on a network, the socket provides a dedicated address whereby messages sent to and received from the socket belong to the application. The message structure contains the message itself. The flags specify any special condition upon which to send the message.

When a user sends a pointer to the message structure through the send request, the kernel makes a copy of the message. A copy is made because the kernel memory and user memory are in separate virtual spaces in an attempt to provide security. The copying is typically performed through DMA (as described above). Further, the virtual address is mapped to a physical input/output (I/O) address to send the message using the network interface. An I/O MMU is responsible for performing the mapping from the virtual address to the physical I/O address.

Once the mapping is performed, the kernel is responsible for encoding the message (including encrypting), providing error checking, and resending the message (if necessary), etc. The kernel then sends each packet of the message to the receiving node. When the packet arrives, the kernel of the receiving node places the packet in a message buffer of the appropriate application.

One mechanism for performing the protocols for sending the message is to offload the message onto a Network Interface Card (NIC). The NIC may then be used to perform the protocols for sending the message. In order to offload the messages, DMA may be employed to transfer the messages onto the NIC.

Often, a user-level application sends several messages at one time. These messages may be the same message to several clients, such as a server broadcasting packets in a to several clients in an online chat room, or the server sending different messages to different clients. In order to send the messages, the user-level application creates a separate system call requesting to send the message for each receiving node. With each system call, the processor is used to perform the DMA and the I/O MMU performs the mapping (as described above).

In order to avoid the overhead of creating several system calls, an Internet Protocol (IP) multicast group address may be created. In such a scheme, the sending node specifies the IP multicast group address to send the message. The receiving nodes request membership to the group using the group address. Upon receiving a message with the group address, any router with a list of the group members reroutes the message to each member. This scheme requires that the messages sent contain the same data to be sent, and the routers having the capabilities of identifying the members of the groups and forwarding the messages to those members.

SUMMARY OF INVENTION

In general, in one aspect, the invention relates to a method for sending a plurality of messages to a plurality of recipients comprising obtaining the plurality of messages for the plurality of recipients, grouping the plurality of messages into a data structure, generating a system call from a user-level application to a kernel, wherein the system call comprises a reference to the data structure, and for each message in the plurality of messages in the data structure: extracting a selected message from the plurality of messages in the data structure using the reference to the data structure, and sending the selected message to one of the plurality of recipients.

In general, in one aspect, the invention relates to a system for sending a plurality of messages to a plurality of recipients comprising a user-level application for obtaining a plurality of messages for the plurality of recipients, grouping the plurality of messages into a data structure, and generating a system call to a kernel, wherein the system call comprises a reference to the data structure, and the kernel for receiving the system call, and for each message in the plurality of messages in the data structure: extracting a selected message from the data structure using the reference to the data structure, and sending the selected message to one of a plurality of recipients.

In general, in one aspect, the invention relates to a computer usable medium having computer readable program code embodied therein for causing a computer system to execute a method for sending a plurality of messages to a plurality of recipients comprising obtaining the plurality of messages to the plurality of recipients, grouping the plurality of messages into a data structure, generating a system call from a user-level application to a kernel, wherein the system call comprises a reference to the data structure, and for each message in the plurality of messages in the data structure: extracting a selected message from the plurality of messages in the data structure using the reference to the data structure, and sending the selected message to one of the plurality of recipients.

Other aspects and advantages of the invention will be apparent from the following description and the appended claims.

DETAILED DESCRIPTION

Figure 1:
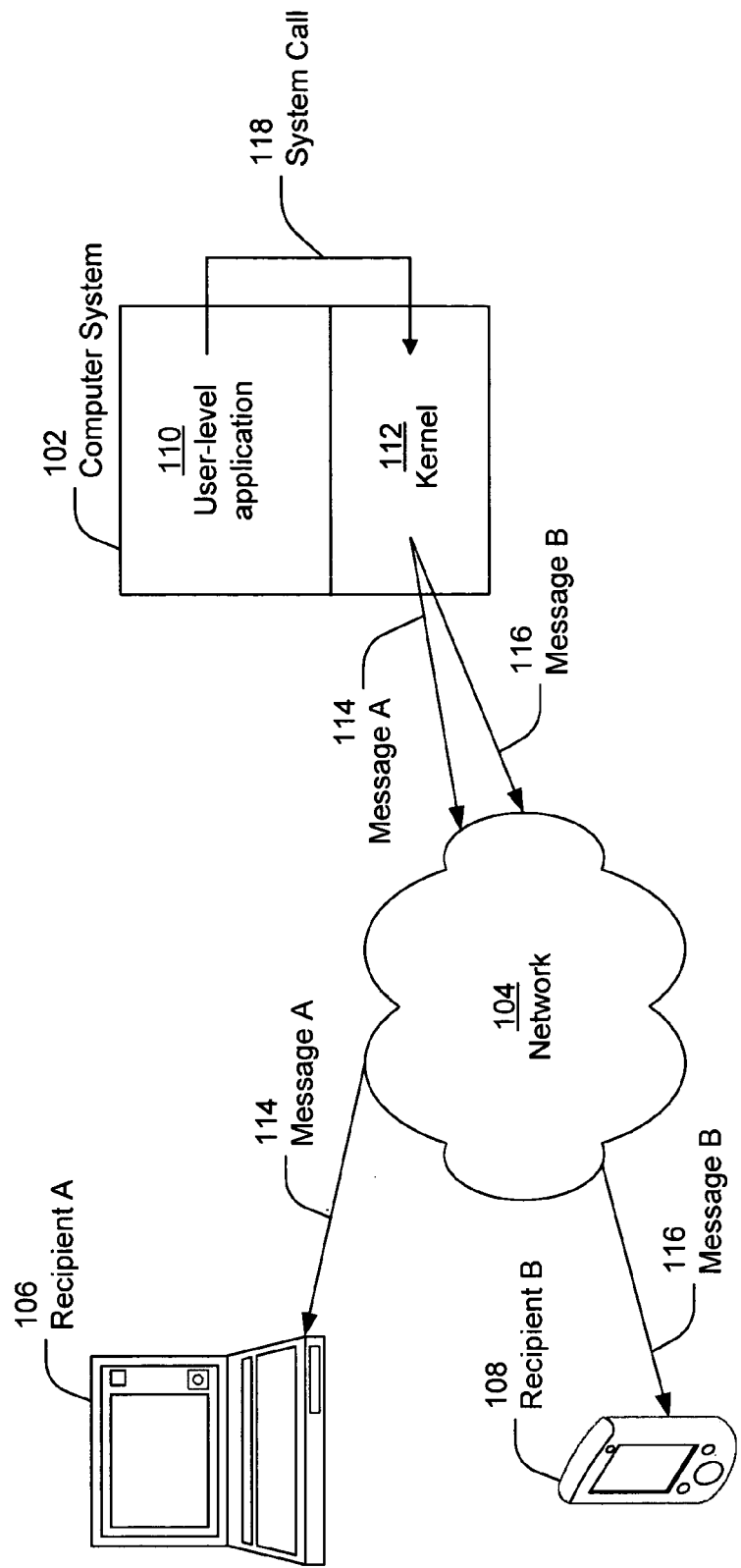
FIG. 1 shows a system architecture in accordance with one embodiment of the invention.

Exemplary embodiments of the invention will be described with reference to the accompanying drawings. Like items in the drawings are shown with the same reference numbers. Further the use of "ST" in the figures corresponds to "Step" in the detailed description below.

In the following description, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention related to sending multiple messages from a user-level application. Specifically, embodiments of the invention allow for application layer multicasting. More specifically, embodiments of the invention allow for the user-level application to send multiple messages in a single system call. These messages may have identical or non-identical information and may be sent to one or more recipients. Additionally, embodiments of the invention provide a method for efficient use of resources when sending multiple messages while not requiring extra functionality to be provided from the routers on the network.

FIG. 1 shows a system architecture in accordance with one embodiment of the invention. The system architecture includes the following components: computer system (102), network (104), recipient A (106), recipient B (108). Each of these components is described in detail below.

The computer system (102) includes functionality to send messages. A message may include data to be sent, recipient address, and any required headers to translate the data for the recipient application. The computer system (102) may be any device on that sends messages, such as a cell phone, personal digital assistant, embedded computer, personal computer, laptop computer etc. Further computer system (102) may include a user-level application (110) and a kernel (112). The user-level application (110) includes functionality to generate message A (114), message B (116), and a system call (118) to request sending the messages. Grouping multiple messages into a single system call allows for significant performance gain. Specifically, the overhead associated with a system call is endured only once for multiple messages. In accordance with one embodiment of the invention, the system call (118) may include a socket descriptor, a count of the number of messages, flags for any special conditions required when sending the message, a reference to a data structure having the messages, etc. A reference to a data structure may correspond, for example, to a pointer to the data structure, a variable which allows the data structure to be copied, an indirect pointer to the data structure, etc.

Figure 2A:
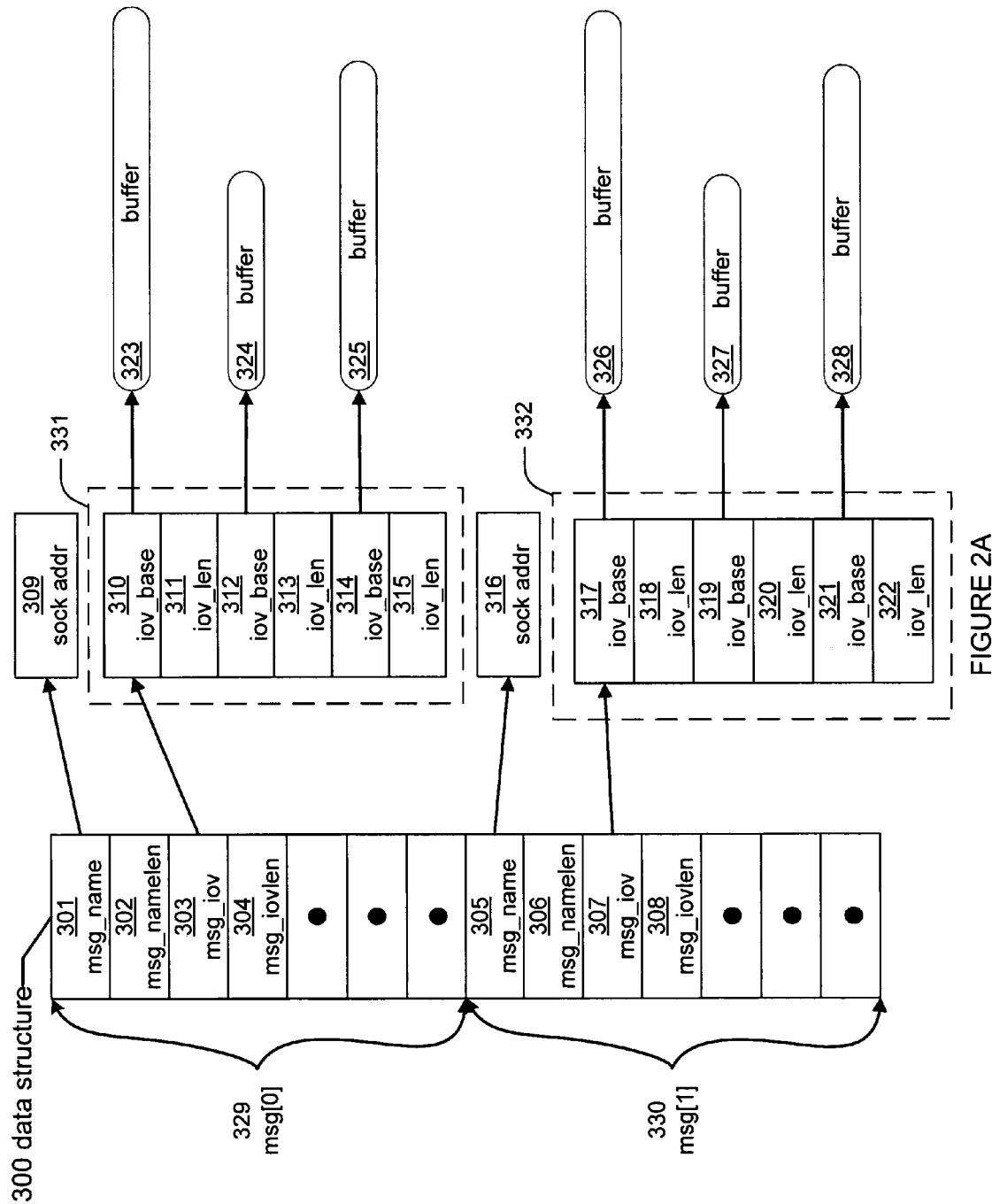
FIGS. 2A-2B show a data structure used in the system call in accordance with an embodiment of the invention.

FIG. 2A shows an exemplary data structure used in the system call, in accordance with an embodiment of the invention. In one embodiment of the invention, the data structure (300) may be an array, vector, link list, etc. Each message (329, 330) in the data structure (300) includes a message header and a message body. The message header describes a socket and a message body containing the data to be sent. The socket defines the endpoints for a connection. Specifically, the socket describes a recipient address, a recipient port number, a local address and a local port number in accordance with one embodiment of the invention. Using the addresses and port numbers described by the socket, remote applications may communicate. In one embodiment of the invention, the socket is described by a msg_name (301, 305) and msg_namelen (302, 306). Msg_name (301, 305) contains a reference to a socket address (309, 316) and the msg_namelen (302, 306) which contains the size of the socket address (309, 316).

In one embodiment of the invention, the message body is associated with one or more message buffers (e.g., 323, 324, 325, 326, 327, 328). Further, each message (329, 330) may have an input/output vector (331, 332) containing the references to the message buffers (e.g., 323, 324, 325, 326, 327, 328) containing the data. This level of indirection allows for variable length messages and allows for the user-level application to divide the message. The input/output vector (331, 332) is described by msg_iov (303, 307) and msg_iovlen (304, 308). Msg_iov (303, 307) contains the memory address of the input/output vector (331, 332). Msg_iovlen (304, 308) contains a number of buffers (e.g., 323, 324, 325, 326, 327, 328) referred to by the input/output vector. The input/output vector (331, 332) contains the base address (e.g., 310, 312, 314, 317, 319, 321) of each message buffer (e.g., 323, 324, 325, 326, 327, 328) and the size (e.g., 311, 313, 315, 318, 320, 322) of each message buffer (e.g., 323, 324, 325, 326, 327, 328). Using the information in the data structure and the system call (118), the kernel (112) may send messages (114, 116) using the network (104).

Figure 2B:
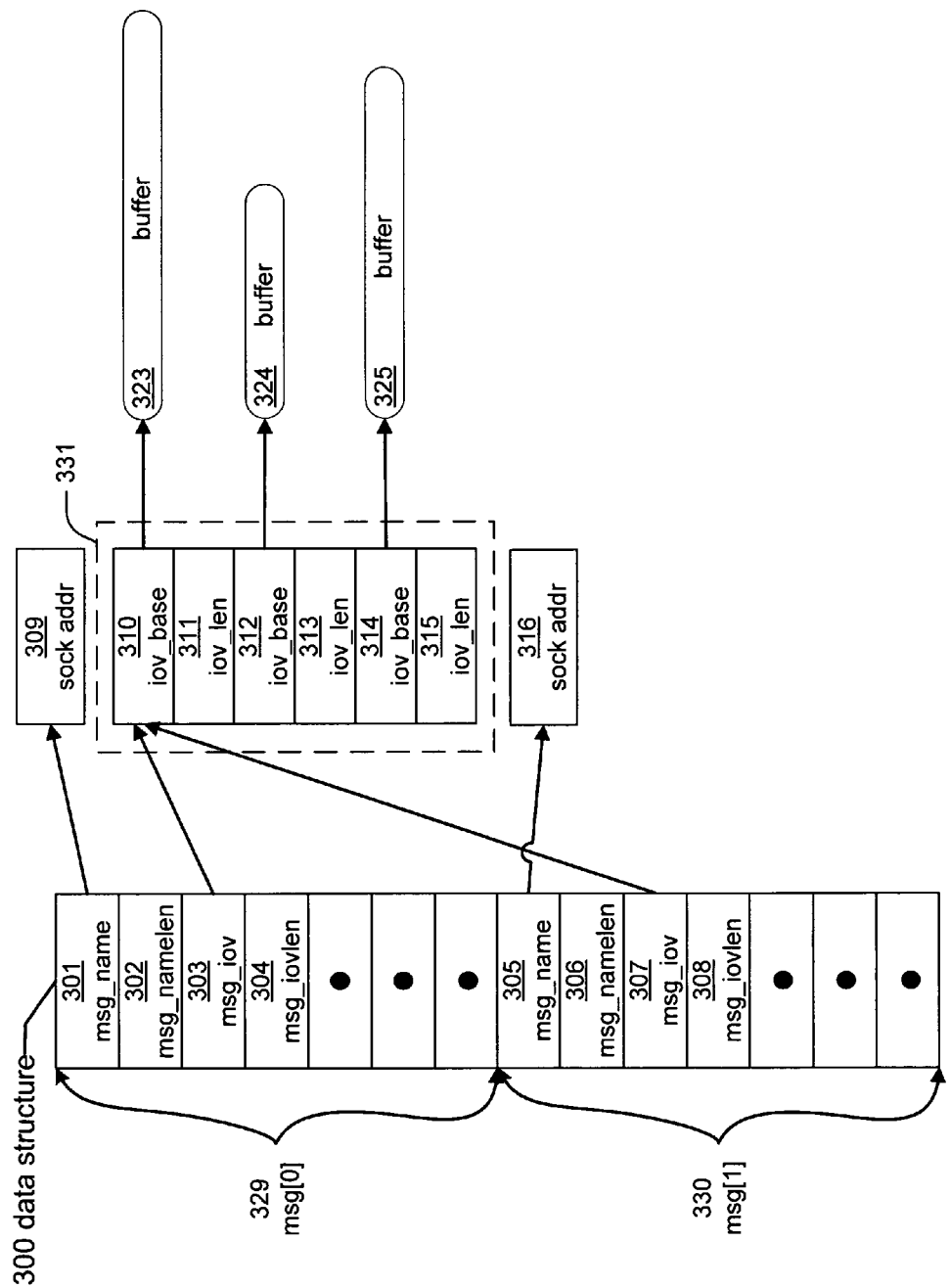

FIG. 2B shows an exemplary data structure (300) used in the system call, in accordance with an embodiment of the invention. Specifically, FIG. 2 shows an example data structure (300) which may be used when the same message body is sent to multiple recipients. In one embodiment of the invention, the data structure (300) includes multiple messages (e.g., msg[0] (329), msg[1] (330)) which may reference the same input/output vector (331) and subsequently the same message buffers (e.g., 323, 324, 325).

Alternatively, rather than the data structure (300) having multiple messages (e.g., msg[0] (329), msg[1] (330)) which reference the same input/output vector, in one embodiment of the invention, a single message (e.g., msg[0] (329)) in the data structure (300) may reference the input/output vector (331) and a vector of socket addresses (not shown). Accordingly, each socket address (309) in the vector of socket addresses may be associated with a separate recipient in the multiple recipients.

Continuing with FIG. 1, the kernel (112) of the computer system (102) includes functionality to translate the system call (118) to divide the data structure into the different messages. In one embodiment of the invention, the kernel (112) also includes an input/output memory management unit (I/O MMU) (not shown) and functionality to perform direct memory access (DMA). The I/O MMU includes functionality to allocate memory and map the virtual address into a physical (I/O) address associated with input/output operations. DMA, as used in connection with this application, is a method for accessing memory without the use of the processor except in an initial phase and final phase.

In one embodiment of the invention, a Network Interface Card (NIC) (not shown) may be used to divide the messages and sent the messages. In order to divide the messages, DMA may be used to transfer the messages onto the NIC. By transferring multiple messages onto the NIC at one time, the overhead associated with DMA is endured only once for several messages. Thus, with the combination of the I/O MMU, DMA, and NIC, the kernel (118) includes the functionality to send message A (114) and message B (116) on the network (104).

The network (104), in accordance with one embodiment of the invention, is an interconnection of computers and related devices. Using the interconnection, the network includes functionality to transfer messages (114, 116) from the computer system (102) to recipient A (106) and recipient B (108). Specifically, the network (104) may include one or more routers for passing the messages (114, 116) to the recipients (103, 104).

For example, the recipient may be a computer such as recipient A (103), a PDA, such as recipient B (104), a cell phone, an embedded system (such as those found in automobiles, consumer appliances, etc.), or any other device that could connect to a network. The recipients include functionality to obtain messages from the network and process the message for the recipient application.

Figure 3:
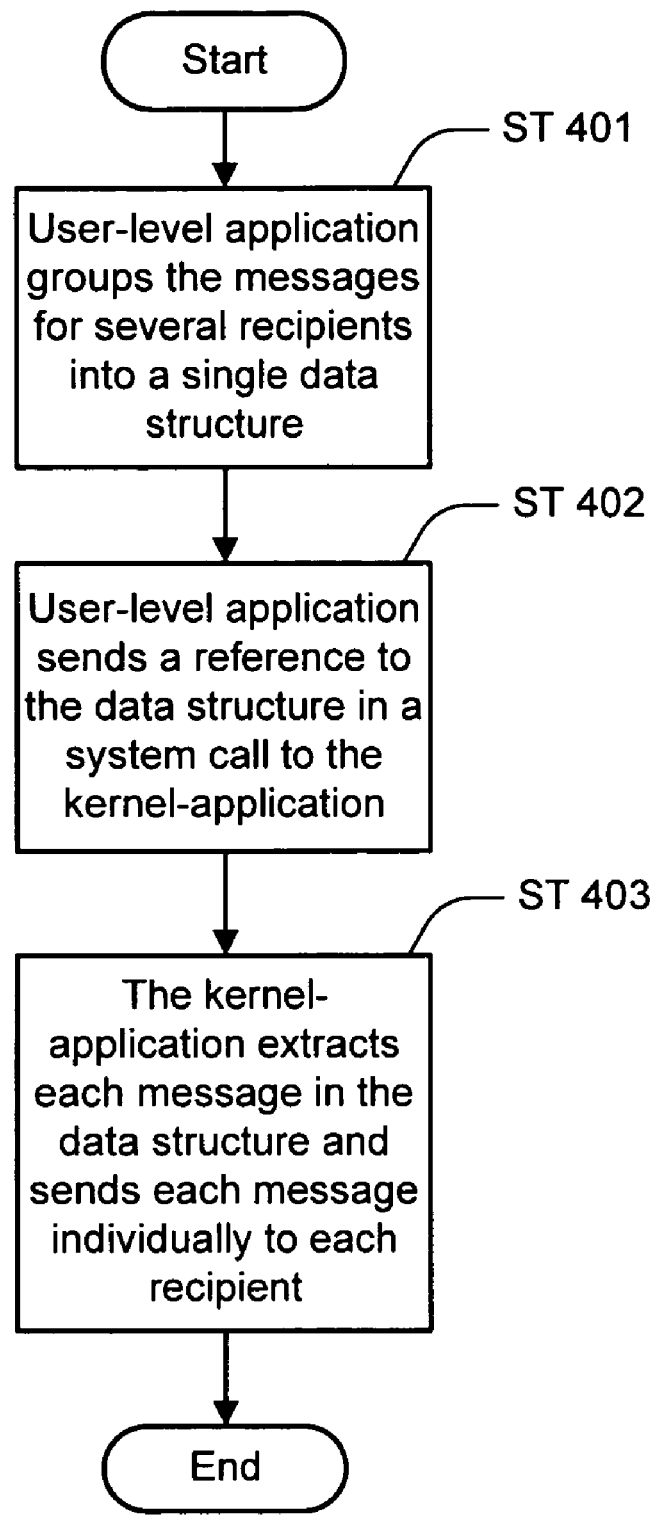
FIG. 3 shows a flowchart for sending messages in accordance with one embodiment of the invention.

FIG. 3 shows a flowchart for sending messages in accordance with one embodiment of the invention. Initially, the user-level application acquires multiple messages to be sent. These messages may be generated by the user-level application or by another application. In one embodiment of the invention, each message may have a socket descriptor and all required information to send the message. Next, the user-level application groups the messages into a single data structure (Step 401). In one embodiment of the invention, the data structure is stored in the virtual address space of the user-level application. Next, the user-level application creates a system call containing a reference to the data structure (Step 402). The system call may also contain the number of messages in the data structure, any flags that are required when sending the messages and a socket descriptor. Finally, the system call is processed by the kernel (Step 403). As part of the processing, in accordance with one embodiment of the invention, the I/O MMU creates a single contiguous block of virtual memory in the kernel address space for all of the messages in the data structure as shown in FIG. 2 and described above. The kernel uses DMA to transfer the data structure, containing all of the messages, at one time from the user address space to the kernel address space. Each message may be extracted from the data structure and sent individually using virtually any routines known in the art for sending messages (Step 403).

In accordance with one embodiment, the data structure has a fixed length number of references for each message. In order to extract a message, the kernel determines the end of a message in the data structure through that length. The kernel keeps a count of the number of messages sent and when that value is the same as in the system call, all of the messages are deemed sent.

Alternatively, in one embodiment of the invention, each message in the data structure may contain references to several input/output vectors. In this embodiment, the data structure also contains a count of the number of references to the input/output vector in order to extract each message. Thus, when each message is sent, the kernel application may iterate through each message and according to the length of a message determine the end of one message and the start of the next message. The kernel keeps a count of the number of messages sent and when that number equals the number in the system call, all of the required messages are deemed sent.

Those skilled in the art will be able to recognize that routines for sending messages may include such actions as encrypting the message, dividing the message into packets, etc. The messages may be sent using protocols such as Transport Control Protocol (TCP) or User Datagram Protocol (UDP) and Internet Protocol (IP). Those skilled in the art will also recognize that the scope of the invention is not intended to be limited to the above protocols and routines. Rather, any protocol which allows for sending a message from a user-level application via the kernel may be used.

Figure 4:
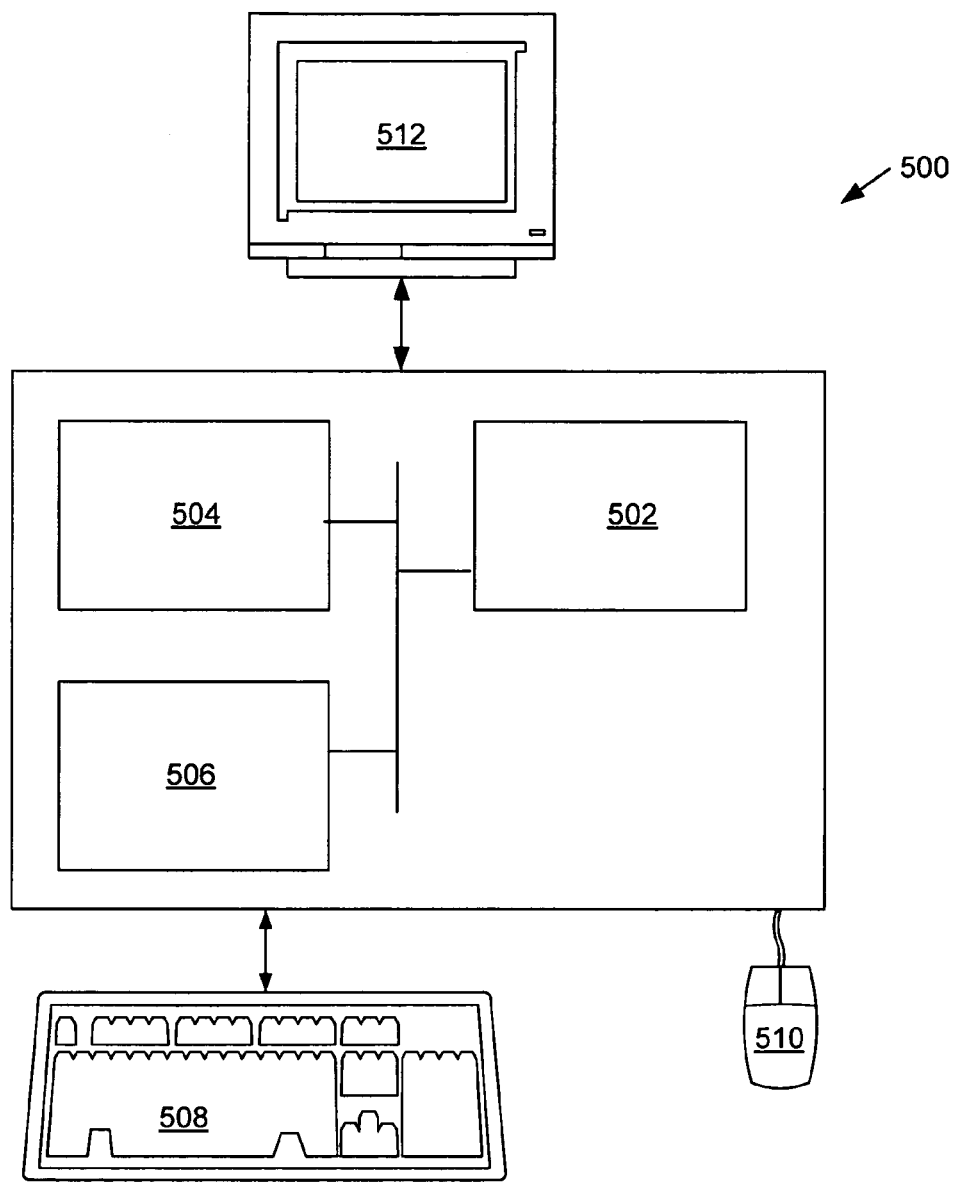
FIG. 4 shows a computer system in accordance with one embodiment of the invention.

The invention may be implemented on virtually any type of computer regardless of the platform being used. For example, as shown in FIG. 4, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., user-level application, kernel, data structure, etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, a file, or any other computer readable storage device.

The present invention may include one or more of the following advantages. Specifically, by using application-layer multicasting rather than IP multicasting, network routers are not required to support sending multiple messages. More specifically, sending multiple messages from the user-level application only needs to be supported by the Kernel rather than by all of the network routers.

Further, the performance gain of the user-level application only creating one system call in order to send multiple messages is substantial. Additionally, the overhead associated with a system call is endured only once for all of the messages that a user-level application sends. By grouping the messages into a single data structure and using a single system call, the I/O MMU may create a single continuous block of memory for the messages. Thus, the overhead associated with mapping each message to a physical I/O address is minimized. Furthermore, in order to send the several messages, the initialization and finalization phase only needs to be performed once. Specifically, rather than setting up the transfer of multiple messages to get the messages out and onto the Thus, there are significant performance gains when sending multiple messages using a single system call.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for sending a plurality of messages via a network to a plurality of recipients comprising the following computer-implemented steps:
   obtaining the plurality of messages for the plurality of recipients;
   grouping, by a user-level application, the plurality of messages into a data structure;
   generating a system call from the user-level application to a kernel of the system, wherein the system call comprises a reference to the data structure; and
   for each message in the plurality of messages in the data structure:
      extracting, by the kernel, a selected message from the plurality of messages in the data structure using the reference to the data structure; and
      sending, by the kernel, the selected message via the network to one of the plurality of recipients.

2. The method of claim 1, wherein the plurality of messages comprises a message header and a message body.

3. The method of claim 2, wherein the message header comprises a socket descriptor.

4. The method of claim 2, wherein the message body indirectly references a plurality of message buffers.

5. The method of claim 1, wherein a first message in the plurality of messages comprises a first message body, a second message in the plurality of message comprises a second message body, and the first message body is different from the second message body.

6. The method of claim 1, wherein a first message in the plurality of messages comprises a first message body, a second message in the plurality of message references the first message body.

7. The method of claim 1, wherein the system call comprises a count corresponding to a number of messages in the data structure and a flag.

8. The method of claim 1, wherein the data structure is a vector.

9. The method of claim 1, wherein the selected message comprises a field storing a length of the selected message, and wherein the field storing the length of the selected message is used to extract the selected message.

10. The method of claim 1, wherein the plurality of messages comprises a message header and a message body, wherein the message header comprises a socket descriptor, and wherein the message body indirectly references a plurality of message buffers, wherein each of the plurality of message buffers comprises a data portion of the message body of a corresponding message of the plurality of messages.

11. A computer system having a processor for sending a plurality of messages via a network to a plurality of recipients comprising:
   a user-level application for:
      obtaining a plurality of messages for the plurality of recipients;
      grouping the plurality of messages into a data structure; and
      generating a system call to a kernel of the system, wherein the system call comprises a reference to the data structure; and
   the kernel for:
      receiving the system call; and
      for each message in the plurality of messages in the data structure:
         extracting a selected message from the data structure using the reference to the data structure, and
         sending the selected message via the network to one of the plurality of recipients.

12. The system of claim 11, wherein the plurality of messages comprises a message header and a message body.

13. The system of claim 12, wherein the message header comprises a socket descriptor.

14. The system of claim 12, wherein the message body indirectly references a plurality of message buffers.

15. The system of claim 11, wherein a first message in the plurality of messages comprises a first message body, a second message in the plurality of message references the first message body.

16. The system of claim 11, wherein a first message in the plurality of messages comprises a first message body, a second message in the plurality of message comprises a second message body, and the first message body is the same as the second message body.

17. The system of claim 11, wherein the system call comprises a count corresponding to a number of messages in the data structure and a flag.

18. The system of claim 11, wherein the system call further comprises a socket for receiving the plurality of messages for the user-level application.

19. The system of claim 11, wherein the data structure is a vector.

20. The system of claim 11, wherein the selected message comprises a field storing a length of the selected message, and wherein the field storing the length of the selected message is used to extract the selected message.

21. A computer readable storage medium having computer readable program code embodied therein for causing a computer system to execute a method for sending a plurality of messages via a network to a plurality of recipients comprising:
   obtaining the plurality of messages to the plurality of recipients;
   grouping, by the user-level application, the plurality of messages into a data structure;
   generating a system call from the user-level application to a kernel of the system, wherein the system call comprises a reference to the data structure; and
   for each message in the plurality of messages in the data structure:
      extracting, by the kernel, a selected message from the plurality of messages in the data structure using the reference to the data structure; and
      sending, by the kernel, the selected message via the network to one of the plurality of recipients.

* * * * *